United States Patent
Kundu

(10) Patent No.: US 7,919,069 B2
(45) Date of Patent: Apr. 5, 2011

(54) RAPID SYNTHESIS OF TITANATE NANOMATERIALS

(75) Inventor: Animesh Kundu, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 12/138,928

(22) Filed: Jun. 13, 2008

(65) Prior Publication Data

US 2009/0117028 A1    May 7, 2009

Related U.S. Application Data

(60) Provisional application No. 60/943,629, filed on Jun. 13, 2007, provisional application No. 60/954,331, filed on Aug. 7, 2007.

(51) Int. Cl.
    *C01G 23/00*    (2006.01)

(52) U.S. Cl. .................................. 423/598; 423/593.1

(58) Field of Classification Search ............. 423/598, 423/593.1; 977/742, 811
See application file for complete search history.

(56) References Cited

U.S. PATENT DOCUMENTS

| | | | | |
|---|---|---|---|---|
| 4,755,373 | A * | 7/1988 | Gherardi et al. ........... | 423/598 |
| 5,087,437 | A * | 2/1992 | Bruno et al. ............... | 423/598 |
| 7,056,409 | B2 | 6/2006 | Dubrow et al. | |
| 7,116,546 | B2 | 10/2006 | Chow et al. | |
| 7,179,317 | B2 | 2/2007 | Chung et al. | |
| 7,270,693 | B2 | 9/2007 | Chung et al. | |
| 7,276,389 | B2 | 10/2007 | Kim et al. | |
| 7,295,419 | B2 | 11/2007 | Chow et al. | |
| 2006/0078726 | A1 * | 4/2006 | Antonio et al. ............ | 428/328 |

OTHER PUBLICATIONS

Zhu et al., J. Am. Chem. Soc. 2005, 127, 6730-6736.
Zhang et al., J. Phys. Chem. C 2007, 111, 6143-6148.
Zhang et al., Physical Review Letters 91(25), 256103 (Dec. 19, 2003).
Yao et al., Applied Physics Letters 82(2), 281-283 (Jan. 13, 2003).
Yang et al., J. Chem. Soc., Dalton Transactions, 2003, 3898-3901.
Wu et al., Applied Physics Letters 87, 112501 (2005).
Wu et al., Chem. Mater. 2006, 18, 547-553.
Suzuki et al., J. Electrochemical Soc. 154(5), A438-A443 (2007).
Qamar et al., Nanotechnology 17 (2006), 5922-5929.
Pavasupree et al., J. Solid State Chem. 178 (2005), 3110-3116.
Menzel et al., Chem. Mater. 2006, 18, 6059-6068.
Ma et al., Chem. Phys. Lett. 380 (2003), 577-582.
Kolen'ko et al., J. Phys. Chem. B 2006, 110, 4030-4038.
Kasuga et al., Langmuir 1998, 14, 3160-3163.
Jitputti et al., Japanese J. Applied Phys. 47(1), 751-756 (2008).
Jiang et al., Materials Letters 60 (2006), 3803-3808.
Jang et al., Chem. Mater. 2007, 19, 1984-1991. Gong et al., J. Mater. Res. 16(12), 3331-3334 (Dec. 2001).
Ding et al., Nanotechnology 17 (2006), 5423-5427.
Bavykin et al., J. Phys. Chem. C 2007, 111, 14644-14651.

* cited by examiner

*Primary Examiner* — Stuart Hendrickson
*Assistant Examiner* — Richard M Rump
(74) *Attorney, Agent, or Firm* — Pepper Hamilton LLp

(57) ABSTRACT

Provided herein is a hydrothermal process for the rapid synthesis of inorganic nanomaterials (e.g., nanofibers) containing sodium, bismuth, titanium, and oxygen, as well as new compositions made thereby. The process involves heating an aqueous solution or suspension of suitable salts of aforementioned elements at elevated temperature and pressure under constant stirring in a hermetically sealed vessel for a predetermined amount of time (e.g., less than two hours). The powder thus obtained contains nanofibers of rectangular cross-section, with the smallest fibers typically have a cross section of 16 nm×40 nm. Example fibers made by such processes have an aspect ratio exceeding 200.

21 Claims, 1 Drawing Sheet

RAPID SYNTHESIS OF TITANATE NANOMATERIALS

CROSS REFERENCE TO RELATED APPLICATIONS

This application claims the priority of co-pending U.S. provisional patent application No. 60/943,629 (filed Jun. 13, 2007) and 60/954,331 (filed Aug. 7, 2007), and the entire contents of both of these provisional patent applications are incorporated herein by reference.

FIELD

This application describes an improved synthesis of inorganic nanomaterials (e.g., nanofibers) based on titanium, as well as related compositions and uses thereof.

BACKGROUND

Since the discovery of carbon nanotubes, numerous preparation methods and applications of these materials have been realized. In recent times, there has been an increasing attention paid to nanotubes and nanofibers of greater chemical complexity, especially oxide nanotubes and nanofibers, and researchers have successfully prepared nanotubes of $Al_2O_3$, $SiO_2$, $V_2O_5$, $WO_3$, ZnO, $ZrO_2$, and $TiO_2$. Of these, nanotubes and nanofibers of titanium oxide-based materials are of particular interest because of the various interesting properties, such as photocatalytic, semiconducting, gas sensing, and like properties, which are observed in bulk $TiO_2$.

For example, the excellent lithium intercalation behavior of these fibers exceeds that of currently available materials and they therefore may be advantageously used in high performance lithium ion batteries, e.g. for high performance and demanding applications, such as in hybrid automobiles. Highly efficient dye sensitized solar cells using single crystalline titania nanotubes have also been reported. These nanotubes acts as a thin film semiconductor with higher electron transfer through the tubes as compared to nanocrystalline $TiO_2$ films. Use of these materials in high performance ceramic membranes has been reported. In addition, when doped with materials with such specific functionality, these materials can be used for other novel applications. The titanate nanotubes (or $TiO_2$ nanotubes) are usually multi-walled, with dimensions can vary over a large range. These properties can be enhanced and new functionality developed when these materials are prepared in the form of nanotubes/fibers, and a continuing and unmet need exists for improved methods of making such materials.

The synthesis of titanate nanostructures using techniques known in the art typically takes from 24-72 hours. See, e.g. Jang, et al., "Synthesis of Sn-Porphyrin-Intercalated Trititanate Nanofibers: Optoelectronic Properties and Photocatalytic Activities," *Chem. Mater.* 19(8), 1984-91 (2007); Jiang, et al., "Syntheses, Characterization and Properties of Novel Nanostructures Consisting of Ni/Titanate and Ni/Titania," *Materials Letters* 60(29-30), 3803-08 (2006); Zhang, et al., "Formation Mechanism of $H_2Ti_3O_7$ Nanotubes," *Phys. Rev. Lett.* 91(25), 256103 (2003); Zhang, et al., "Electrochemical Lithium Storage of Titanate and Titania Nanotubes and Nanorods," *J. Phys. Chem. C*, 111(16), 6143-48 (2007); Qamar, et al., "Effect of Post Treatments on The structure and Thermal Stability of Titanate Nanotubes," *Nanotechnology* (24), 5922 (2006); Suzuki, et al., "Lithium Intercalation Properties of Reassembled Titanate/Carbon Composites," *J. Electrochem. Soc.* 154(5), A438-43 (2007); Wu, et al., "Sequence of Events for The Formation of Titanate Nanotubes, Nanofibers, Nanowires, and Nanobelts," *Chem. Mater.* 18(2), 547-53 (2006); Wu, "Co-Doped Titanate Nanotubes," *Appl. Phys. Lett.* 87(11), 112501-03 (2005); Pavasupree, et al., "Synthesis of Titanate, $TiO_2$ (B), and Anatase $TiO_2$ Nanofibers from Natural Rutile Sand," *J. Solid State Chem.* 178(10), 3110-16 (2005); Du, et al., "Preparation and Structure Analysis of Titanium Oxide Nanotubes," *Appl. Phys. Lett.* 79(22), 3702-04 (2001); Menzel, et al., "Impact of Hydrothermal Processing Conditions on High Aspect Ratio Titanate Nanostructures," *Chem. Mater.* 18(25), 6059-68 (2006); Ding, et al., "Preparation and Characterization of Fe-Incorporated Titanate Nanotubes," *Nanotechnology* (21), 5423 (2006); Jitputti, et al., "Synthesis of $TiO_2$ Nanotubes and Its Photocatalytic Activity for $H_2$ Evolution," *Japanese J. Appl. Phys.* 47(1), 751-56 (2008); Zhu, et al., "Phase Transition between Nanostructures of Titanate and Titanium Dioxides via Simple Wet-Chemical Reactions," *J. Amer. Chem. Soc.* 127(18), 6730-36 (2005); Kolen'ko, et al., "Hydrothermal Synthesis and Characterization of Nanorods of Various Titanates and Titanium Dioxide," *J. Phys. Chem. B* 110(9), 4030-38 (2006); Ma, "Nanotubes of Lepidocrocite Titanates," *Chem. Phys. Lett.* 380(5-6), 577-82 (2003). In each of the foregoing references, a synthesis of a titanate nanostructure is described. In every case, the reaction times range from 10 hours to as high as 72 hours, with 24 and 48 hours being typical. Clearly such lengthy reaction times are impractical, and need exists for faster synthesis methods having shorter reaction times.

SUMMARY

Provided herein are new and improved methods for the synthesis of inorganic nanomaterials (e.g., nanofibers) based on titanium, as well as related compositions and uses thereof. In an example embodiment, a hydrothermal process is provided for the synthesis of inorganic nanofibers containing sodium, bismuth, titanium, and oxygen, as well as new compositions made thereby. An example process involves heating an aqueous solution or suspension of suitable salts of aforementioned elements at elevated temperature and pressure under constant stirring in a hermetically sealed vessel for a predetermined amount of time. The reaction product thus obtained (e.g., a powder) contains nanofibers of rectangular cross-section, with the smallest fibers typically having a cross section of about 16 nm×about 40 nm. Example fibers made by such processes have an aspect ratio exceeding 200. Reaction times are less than ten hours, typically from one to about eight hours. In some circumstances, yields as high as 100% may be obtained in as little as 30 minutes. Such rapid reaction times provide a substantial improvement over all previously known synthesis methods.

The inorganic nanomaterials (e.g., nanofibers) described herein have several beneficial properties. Recently, there have been several reports on the excellent lithium intercalation properties of hydrogen titanate nanotubes and nanofibers even at low temperatures. Also, these solids could maintain high capacity and good cycle stability under a high charge and discharge rates. Titanate nanostructures have also proved to be a suitable electrode material for achieving higher power output and faster charging times in Li-ion batteries. Similarly, these inorganic nanofibers may be used in solar cells with higher efficiency than the present solar cells. Additional applications include use of the inorganic nanofibers as ceramic membranes for water purification. Furthermore, the presence of these fibers has been observed to enhance bone growth around titanium prosthetic implants.

Additional features and advantages may be understood by referring to the accompanying Drawings, which should be read in conjunction with the following Detailed Description and Examples.

DETAILED DESCRIPTION AND EXAMPLE EMBODIMENTS

Figure 1:
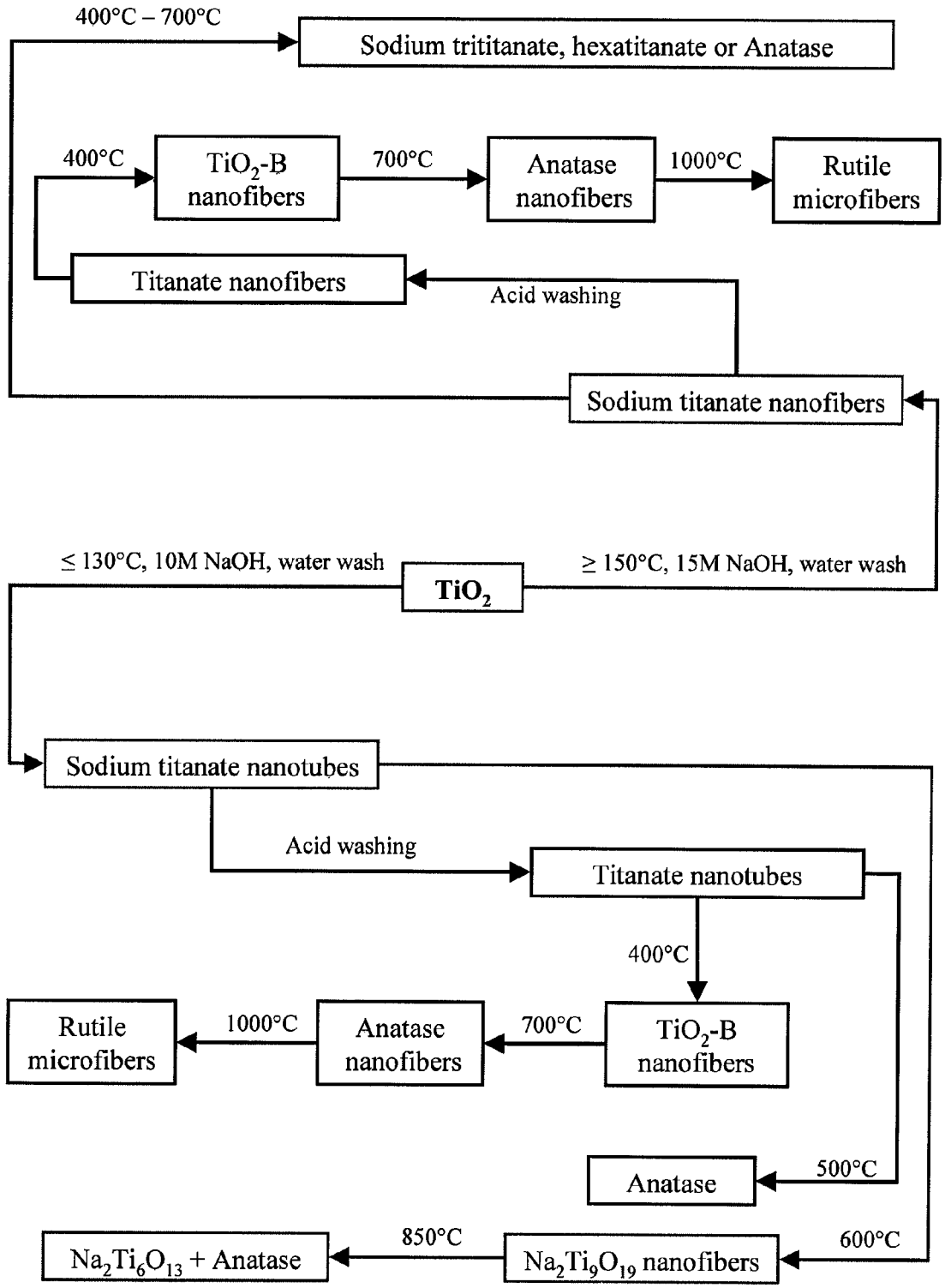
FIG. 1 schematically illustrates various transformation routes of titanate nanostructures in accordance with an example embodiment hereof.

Provided herein are new inorganic nanomaterials (e.g., nanofibers) based on titanium, as well as related compositions, the manufacture thereof, and uses thereof. In particular, improved methods for the synthesis of inorganic titanium oxide-based nanofibers are disclosed. Heretofore, three general types of syntheses have been proposed for the preparation of these nanotubes/fibers: a template method, an electrochemical method, and a hydrothermal method. Each of these methods, however, requires multiple reaction steps, long reaction times (e.g., greater than 20 hours), or other disadvantageous reaction conditions. The new synthesis methods disclosed herein overcome these deficiencies (e.g., permitting considerably faster reaction times) and provide other benefits. As used herein, a "nanomaterials" is meant to include nanotubes or nanofibers, and an example nanotube or nanofiber has an aspect ratio of about 200.

In a known method referred to as the "template" method, titanium oxides are deposited on nanofiber template aggregates by sol-gel or solution based techniques, followed by selective removal of the templates. The nanotubes thus obtained are often amorphous and require calcination for crystallization of nanotubes. The nanotubes after calcination are usually polycrystalline anatase. The dimensions of the nanotubes can be varied over a wide range from a few nanometers to few micrometers by proper choice of template material and dimensions.

In a known method referred to as "electrochemical synthesis" has been reported the preparation of the $TiO_2$ nanotube arrays by anodic oxidation of pure titanium sheet in a HF solution (0.5 to 3.5 wt %) at room temperature. See, e.g. Gong, et al., "Titanium Oxide Nanotube Arrays Prepared by Anodic Oxidation," *J. Mater. Res.* 16(12), 3331-34 (2001). Several other fluoride electrolytes have been reported for the preparation of titanium oxide nanotubes arrays since then. With proper choice of electrolytes, electrolyte concentration and electrode potential the dimensions of the nanotubes can be varied. Nanotubes with an internal diameter as small as 25 nm and up to ~100 nm and length as large as 2.4 µm have been reported. When prepared by electrochemical synthesis the nanotubes are amorphous and on calcination forms a mixture of anatase and rutile phases. However, from the perspective of practical applications, fabrication of organized nanotube arrays on a metal substrate in a single step can be advantageous.

A "hydrothermal synthesis" of titanate nanotubes of diameter ~8 nm and length ~100 nm includes treating an amorphous $TiO_2$ suspension in concentrated NaOH (10 M) solution at 60° C. and 110° C. for 20 hours. See, e.g. Kasuga, et al., "Formation of Titanium Oxide Nanotube," *Langmuir* 14(12), 3160-63 (1998). Nanotubes were not formed with further decrease in temperature (20° C.) and sodium hydroxide (5 M) concentration. The nanotubes were reported to be single crystals and composed of anatase. Following this investigation, numerous publications have reported hydrothermal synthesis of titanate nanotubes or nanofibers from various titanium salts under different reaction conditions.

Improved Hydrothermal Synthesis Method

Provided herein is an improved hydrothermal synthesis method for the preparation of titanate nanomaterials (e.g., nanofibers). In a typical reaction, 0.04 moles of titanium precursor is added to 50 mL 15 M sodium hydroxide solution, and the suspension is heated at 150° C. for 1-20 hours under constant stirring at ~600 rpm. Sodium edetate is also added to the solution before the reaction. After a predetermined reaction time (e.g., less than about ten hours and more preferably less than about eight hours), a white precipitate with a supernatant solution is obtained. The precipitate is filtered and successively washed with deionized water and 0.1 N hydrochloric acid solution. The acid-washed precipitate is further washed with deionized water until the pH of the eluted liquid is approximately neutral. The section acid wash leaches the sodium ions in the titanates, replacing them with hydrogen ions. The precipitate is washed with ethanol and typically kept suspended in ethanol for further use or characterization. Hydrothermally prepared titanates can be nanotubes or nanofibers. Nanotubes are generally formed at lower temperatures ($\leq 130°$ C.), and lower concentration of sodium hydroxides (~10 M), whereas nanofibers are generally formed at higher concentrations (15 M), longer reaction times and temperatures ($\geq 150°$ C.).

Of course, the foregoing reaction conditions may be modified to produce larger or smaller quantities of nanotubes and/or nanofibers by varying the amount of starting materials that are reacted. Furthermore, the concentration of the precursors and the reaction time may be varied to optimize the reaction conditions. Reactions may also be carried out at 10 M sodium hydroxide solution to observe the effect of mineralizer concentration on the phase, crystallinity, and morphology of the nanofibers. As observed by scanning electron microscopy, the fibers had a rectangular cross-section with aspect ratio in excess of 200. A small cross-section of 16 nm×40 nm has also been observed by scanning electron microscopy. Without being limited to a single theory, it is believed that in addition to sodium EDTA, the presence of citric acid and ethanol may promote the growth of the fibers. However, use of sodium EDTA is preferable over citric acid.

Both pure-phase anatase and rutile were used as titanium precursor to observe the effect of the starting materials. To investigate the effect of sodium edetate, reactions were done with sodium edetate amount varying from 0-0.08 moles/liter. The reaction products were washed as previously described, and the crystallinity, phase, and morphology were investigated with the aid of X-ray diffraction and electron microscopy.

Vertically aligned nanofibers were also grown on titanium substrates. A 99.995% pure titanium foil (0.127 mm thick) was used as the substrate. The substrate was washed with acetone and DI water successively and used for the reaction. The substrate was submerged in a 15 M sodium hydroxide solution and the reactions were carried out at 150° C. for 0.5-1 hour. Sodium edetate (1:1 molar ratio of titanium and sodium edetate) was also added to the sodium hydroxide solution before the reaction. Initially, the solution was stirred for homogenization but the stirring was stopped as the desired reaction temperature was achieved. Next, the reaction was cooled at ~10° C./min and the substrate was removed. The substrate with the nanofibers (which collectively morphologically resembled carpets) were ultrasonicated in DI water to remove excess sodium, and dried at ~50° C. overnight. Any attempt to prepare these fibers on other substrates (titanium coated strontium titanate, titanium metal substrate with a thick oxide buffer layer) proved futile. No fibers are formed on the first case. The titanium layer was dissolved leaving the strontium titanate substrate with a thin residual titanium layer in certain patches. No reaction occurred in the substrate in the second case. The oxide layer was intact. From previous experience, it is known that $TiO_2$ usually reacts under these conditions. The oxide layer was probably some other suboxide of titanium. Energy dispersive spectra showed that the composition may be TiO.

Accordingly, in an embodiment, provided herein is a method for manufacturing a titanate nanomaterial comprising steps of (1) reacting a titanium precursor in alkaline aqueous media at an elevated temperature in the presence of an organic acid for a predetermined amount of time, wherein the predetermined amount of time is less than about ten hours (e.g., less than about eight hours, less than about six hours, less than about four hours, less than about two hours, less than about an hour, or even shorter times); and thereafter (2) isolating a titanate nanomaterial from the product of the previous step. For example, the titanium precursor may be titanium dioxide (e.g., anatase or rutile). The alkaline aqueous media typically comprises sodium hydroxide, which may be present at a concentration of at least 10 molar or, in an alternative embodiment, at a concentration of at least 15 molar. The reaction is carried out at an elevated temperature of, e.g. at least 130° C. or, in another embodiment, the elevated temperature is at least 150° C. The organic acid may be selected from the group consisting of EDTA, citric acid, and salts thereof, such as sodium edetate. In a typical embodiment, the reacting step is carried out at elevated pressure, which may be achieved by conducting the reaction in a sealed reaction vessel while applying heat. The isolating step of the aforementioned method may include a step of washing a reaction product with water or an organic alcohol (e.g., ethanol or isopropanol). In another embodiment, the method may further include a step of washing the reaction product with an acidic aqueous solution (e.g., the acidic aqueous solution may include) hydrochloric acid. In yet another embodiment, the reacting step of the method may be carried out in the presence of a titanium substrate, such that the nanomaterial is formed upon (e.g., covalently bonded to) at least one surface of the substrate.

Post-Synthesis Treatment of Titanates Nanofibers and Thermal Stability Thereof

The thermal evolution of nanofibers and nanotubes results in the modification of their structure and morphology. Referring to the attached Drawings, a generalized scheme of transformation titanate nanostructures on heating is shown in FIG. 1. The nanofibers are comparatively more stable and maintain nanofibrous texture up to ~1000° C. Upon heating, the fibers form $TiO_2$—B at ~400° C. and convert to anatase and rutile, respectively, on further heating at higher temperatures. The formation of sodium hexatitanate has been reported when titanate nanofibers prepared by an 18 hours hydrothermal treatment are calcined at elevated temperature, but anatase is formed for samples prepared by similar hydrothermal conditions for 12 or 24 hours are calcined at elevated temperatures.

It has been further observed that titanate nanotubes are converted to anatase when calcined at 500° C. for 1 hour, and sodium titanate nanotubes maintain their tubular morphology up to 600° C., although the lattice spacing decreases correspondingly to release of water molecules adsorbed between the layers. Above 600° C. the structure collapses to form fibrous morphology. Also the tubes undergo phase change to $Na_2Ti_9O_{19}$ at this temperature and converted to a mixture sodium hexatitanate and anatase at 850° C.

Further hydrothermal treatment of titanate nanofibers in an acidic solution results in the formation of polycrystalline anatase nanostructures. At lower nitric acid concentration, hydrothermal post treatment of the crystalline nanofibers formed appear to be anatase, while at higher concentration (2.65 M) hydrothermal post treatment the nanofibers appear to be rutile. Nucleation of anatase occurs at multiple sites simultaneously in the nanofibers and grow to form a polycrystalline nanofiber at higher temperatures. In the case of rutile nanofibers, it has been proposed that partial dissolution of the nanotubes and rearrangement of the $TiO_6$ octahedra led to the formation of rutile. Instead of polycrystalline nanofibers, titania noncrystalline aggregates are formed for similar hydrothermal treatment at lower temperatures (~80° C.) and low $HNO_3$ concentration (0.05 M). At higher temperatures and/or higher acidic concentration, nanofibers are formed.

Therefore, in accordance with the principles hereof, the nanofibers produced by the new synthesis method disclosed herein may be subsequently converted to a variety of other useful titanium-based materials. As illustrated in FIG. 1, such post-synthesis processing steps may include heating (e.g., to 400° C., 600° C., 700° C., 850° C., or even 1000° C.) or acid washing, among others.

Mechanism of Formation of Titanate Nanostructures

An understanding of the formation mechanism of titanate nanostructures provides insights to the structure and morphology of these materials, as well as guidance to facilitate the design of nanomaterials useful for specific applications. The formation of single and multilayered titanate nanosheets from $TiO_2$ and its key role in the formation nanotubes and nanofibers is well recognized in the art, although the mechanism of formation of nanosheets from the precursor is not understood. One theory is that nanosheets exfoliate from the precursor, and another theory holds that lamellar structures are formed by partial dissolution of precursor in concentrated NaOH solutions followed by nucleation of $Na_2Ti_3O_7$ followed by their subsequent growth. These ideas have been combined to provide a plausible explanation of the mechanism of formation of nanosheets. See, e.g. Yang, et al., "Study on Composition, Structure and Formation Process of Nanotube $Na_2Ti_2O_4(OH)_2$," *Dalton Transactions* (20), 3898-901 (2003). Not all the Ti—O bonds are same in titania, and in a concentrated NaOH hydroxide solution under hydrothermal conditions the weaker Ti—O bonds are thought to break and form linear fragments. These linear fragments exfoliates and with the aid of $O^-$—$Na^+$—$O^-$ ionic bonds link to each other to grow on to planar fragments or nanosheets.

Another proposed mechanism of formation of nanotubes from nanosheets is by rolling of the sheets, wherein sheets form at low temperature hydrothermal reactions and at higher temperature nanotubes are formed. See, e.g. Yao, et al., "Formation Mechanism of $TiO_2$ Nanotubes," *Appl Phys. Lett.* 82(2), 281-83 (2003). Alternatively, multiple sheets can roll one after another on an already formed tube to form thicker tubes. Likewise, the driving force for multilayered titanate nanosheets rolling has been proposed to be the mechanical tension due to the difference in width of the layers in the multilayered nanosheets. The larger sheets formed the outer layers of the nanotubes, while smaller ones formed the inner layers resulting in defective seam along the length of the nanotubes which is observed in nanotubes in many occasions. Others have suggested that the lamellar structures form by partial dissolution of titania precursor and re-precipitation of $Na_2Ti_3O_7$. During the cooling after the reaction the lamellar nanosheets wrap to form nanotubes. In other case when the nanosheets were thicker, nanowires may be formed by splitting of the thick $Na_2Ti_3O_7$ layers. See, e.g. Zhang, et al., "Formation Mechanism of $H_2Ti_3O_7$ Nanotubes," *Physical Review Letters* 91(25), 256103 (2003); Bavykin, et al., "The Effect of Hydrothermal Conditions on The Mesoporous Structure of $TiO_2$ Nanotubes," *J. Mater. Chem.* 14, 3370-77 (2004); Wu, et al., "Sequence of Events for The Formation of Titanate Nanotubes, Nanofibers, Nanowires, and Nanobelts," *Chem. Mater.* 18(2), 547-53 (2006).

Understanding the structure and composition of these nanostructures, as well as the mechanism of their formation, provide insights helpful in tailoring the properties for specific applications. For example, in light of the foregoing discussion doping these materials with different elements may lead to various novel structures and applications.

Various principles hereof will be more fully understood by reference to the following Examples, which should not be construed as limiting the scope of the appended Claims.

EXAMPLES

Example 1

In this Example, a hydrothermal process for the synthesis of nanofibers containing sodium, bismuth, titanium and oxygen is described. The process involves heating an aqueous solution/suspension of suitable salts of aforementioned elements at elevated temperature and pressure under constant stirring in a hermetically sealed vessel for a stipulated amount of time. The powder thus obtained contains nanofibers of rectangular cross-section. In the following synthesis, the smallest fiber measured had a cross section of 16 nm×40 nm, and these fibers had an observed aspect ratio exceeding 200. Such a large aspect ratio is surprising in view of known prior art Ti fibers and methods.

The reaction conditions were as follows: Temperature: 150° C.; Autogenous pressure: 0.476 MPa (calculated); Starting materials: titanium oxide, bismuth oxide, sodium hydroxide, disodium edentate; Reaction time: 2 hours. A sodium hydroxide solution (concentration 15 moles/$dm^3$) was prepared by dissolving sodium hydroxide pellets in 50 mL deionized water. The starting materials were (titanium oxide, bismuth oxide and disodium edentate, present in the ratio 1:2:2, respectively, in moles) were suspended in the sodium hydroxide solution. The suspension was then heated in a hermetically sealed reaction vessel (made of PFA) for 2 hours at 150° C. under constant stirring. The pressure inside the vessel is the autogeneous pressure of water at the reaction temperature. The reaction product thus obtained was washed with deionized water to remove unwanted ions, followed by alcohol washing to avoid formation of hard agglomerate.

The reaction product contained nanofibers. The fibers had a rectangular cross-section (as observed by SEM) and were often present in the form of agglomerates (although the nanofibers were still clearly observable by SEM). Elemental analysis (EDS) of the fibers confirmed the presence of oxygen, sodium, bismuth, and titanium in the fibers. Heating the fibers at 900° C. for four hours results in ~10% weight loss, and as expected the calcined (heat-treated) fibers had a round (i.e., non-rectangular) cross-section and a smaller aspect ratio as observed by SEM.

Addition of $Na_2EDTA$ to the hydrothermal suspension reduced the reaction time. It should be noted that the synthesis reaction time (2 h) in this Example 1 is significantly shorter than would be required to make similar inorganic titanium-based nanofibers using other art-recognized techniques.

Example 2

Titanate nanofibers were prepared by a hydrothermal method. Hydrothermal synthesis is a wet chemical route for crystallizing substances from high-temperature aqueous solutions or suspension at high vapor pressures. With suitable starting materials and proper control of reaction parameters, complete conversion of the raw materials to nanofibers was possible within 8 hours (as compared to 48 hours, which would have been required by all heretofore art-recognized synthesis methods). The nanofibers had a rectangular cross-section with size as small as 15-40 nm and aspect ratio exceeding 200.

Nanofibers were prepared from both rutile and anatase, under the following reaction conditions: Reaction temperature: 150° C.; Reaction time: 8 hours for anatase, 16 hours for rutile; $Na_2EDTA$ concentration: 0.08 moles/liter of DI water. Under these particular reaction conditions, incomplete conversion to nanofibers from rutile was observed even though the reaction time was twice that for anatase. However, for anatase the reaction was complete within 8 hours, and the fibers had better phase stability when prepared form anatase. TEM images revealed that the reaction products contained nanofibers.

Nanofibers are also prepared with different amount of sodium edentate ($Na_2EDTA$). The reaction parameters were as follows: Temperature: 150° C.; Reaction time: 1-8 hours; Sodium hydroxide concentration: 15 moles/liter of DI water; $Na_2EDTA:TiO_2$ molar ratio: 0-2. After the hydrothermal treatment, the suspension was washed repeatedly to remove the sodium ions. Next, the powder was washed with isopropanol to reduce agglomeration of the fibers. Addition of $Na_2EDTA$ to the hydrothermal suspension reduced the reaction time. Complete conversion of the raw material to titanate nanofibers was possible within 8 hours. The size of the fibers vary from a few 10s of nanometer to a few 100s of nanometer, but they always had a rectangular cross-section as observed by SEM.

X-ray diffraction analysis and scanning electron microscopy of powers prepared from anatase at 150° C. for four hours with different EDTA content were also consistent with the presence of titanium oxide-nanofibers. It was observed that increasing amount of $Na_2EDTA$ addition results in faster reaction times and improved crystallinity of the fibers. Although there was a considerable amount of material that is not converted to fibers in a reaction conducted without $Na_2EDTA$ no X-ray diffraction peak corresponding to anatase was observed; instead an unknown peak (thought to belong to semi-reacted species) was observed at $2\theta=18.15°$ whose intensity decreased with increasing amount of $Na_2EDTA$ addition. Because semi-reacted species were present even in the reactions with $Na_2EDTA$ addition, it can be inferred that $Na_2EDTA$ results in faster kinetics rather than alternate route to the final product.

Accordingly, when $Na_2EDTA$ was present in the reaction mixture, titanate nanofibers were successfully prepared within a relatively shorter reaction time of 8 hours. The fibers had a rectangular cross-section with very high length to cross-section aspect ratio. Furthermore, $Na_2EDTA$ addition resulted in faster kinetics (rather than alternate route) to the final product.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the accompanying Drawings and the discussion above there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended Claims not be limited to the particular embodiment disclosed herein.

The invention claimed is:

1. A method of manufacturing a titanate nanomaterial comprising steps of
   Reacting starting materials consisting of a titanium precursor in alkaline aqueous media and an organic acid at an elevated temperature at a temperature of at least about 100 degrees Celsius for a predetermined amount of time, wherein the predetermined amount of time is less than about eight hours to produce a rectangular titanate nanofiber having a rectangular cross section of at least about 10 nanometers and an aspect ratio of at least about 200.

2. The method according to claim 1, wherein the titanium precursor is titanium dioxide.

3. The method according to claim 2, wherein the method produces a yield of about 100%.

4. The method according to claim 2, wherein the titanium dioxide comprises at least one of anatase or rutile.

5. The method according to claim 1, wherein the alkaline aqueous media comprise sodium hydroxide.

6. The method according to claim 5, wherein the sodium hydroxide is present in the alkaline aqueous media at a concentration of at least 10 molar.

7. The method according to claim 5, wherein the sodium hydroxide is present in the alkaline aqueous media at a concentration of at least 15 molar.

8. The method according to claim 1, wherein the temperature is at least about 130 Degrees C.

9. The method according to claim 1, wherein the temperature is at least about 150 Degrees C.

10. The method according to claim 1, wherein the organic acid is selected from the group consisting of EDTA, citric acid, and salts thereof.

11. The method according to claim 10, wherein the organic acid is sodium edatate.

12. The method according to claim 1, wherein the predetermined amount of time is less than about two hours.

13. The method according to claim 1, wherein the predetermined amount of time is less than about 1 hour.

14. The method according to claim 1, wherein the reacting step is carried out at elevated pressure.

15. The method according to claim 14, wherein the elevated pressure is achieved by conducting the reaction in a sealed reaction vessel while applying heat.

16. The method according to claim 1, wherein the nanomaterial comprises nanotubes or nanofibers.

17. The method according to claim 16, wherein the nanotubes or nanofibers have an aspect ratio of about 200.

18. The method according to claim 1, wherein the starting material further includes an organic alcohol, and wherein the organic alcohol comprises ethanol or isopropanol.

19. The method according to claim 1, further comprising a step of washing the reaction product with an acidic aqueous solution.

20. The method according to claim 19, wherein the acidic aqueous solution comprises hydrochloric acid.

21. The method according to claim 1, wherein the reacting step is carried out in the presence of a titanium substrate, such that nanomaterial is formed upon at least a surface of the substrate.

* * * * *